(12) United States Patent
Hane

(10) Patent No.: US 10,232,871 B2
(45) Date of Patent: Mar. 19, 2019

(54) PUSHCART

(71) Applicant: Murata Manufacturing Co., Ltd., Kyoto (JP)

(72) Inventor: Yoshitaka Hane, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 251 days.

(21) Appl. No.: 15/092,711

(22) Filed: Apr. 7, 2016

(65) Prior Publication Data

US 2016/0221595 A1 Aug. 4, 2016

Related U.S. Application Data

(63) Continuation of application No. PCT/JP2014/076752, filed on Oct. 7, 2014.

(30) Foreign Application Priority Data

Oct. 10, 2013 (JP) .................................. 2013-212985

(51) Int. Cl.
*B62B 5/00* (2006.01)
*B62B 5/02* (2006.01)
(Continued)

(52) U.S. Cl.
CPC ............. *B62B 5/0433* (2013.01); *A61H 3/04* (2013.01); *B62B 3/00* (2013.01); *B62B 5/0033* (2013.01);
(Continued)

(58) Field of Classification Search
CPC ... B62B 5/0033; B62B 5/0069; B62B 5/0026; B62B 5/0404; B62B 5/0433;
(Continued)

(56) References Cited

U.S. PATENT DOCUMENTS 3,117,653 A * 1/1964 Altherr ..................... B62B 5/04
188/20
5,328,000 A * 7/1994 Rutter ................. B60B 33/0078
16/35 R
(Continued)

FOREIGN PATENT DOCUMENTS

JP H04-306691 A 10/1992
JP H10-338142 A 12/1998
(Continued)

OTHER PUBLICATIONS

International Search Report issued in Application No. PCT/JP2014/076752 dated Nov. 18, 2014.
(Continued)

*Primary Examiner* — Frank B Vanaman
(74) *Attorney, Agent, or Firm* — Pearne & Gordon LLP

(57) ABSTRACT

A step board is attached to a main body in a rotatable manner. The step board is biased toward the upper side due to a tensile force of a spring while taking a position at which the step board is attached to the main body as an axis, and an attachment angle thereof is so fixed by a stopper as to fall within a predetermined angle. On the lower side of the step board, a cylinder unit covering a side surface of the bar-like main body is provided. The cylinder unit is connected to a brake shoe. Accordingly, when the step board is stepped on, the cylinder unit is moved downward so that the brake shoe makes contact with part of a rear wheel, thereby limiting a rotational velocity of the rear wheel.

20 Claims, 10 Drawing Sheets

(51) Int. Cl.
  *B62B 5/04* (2006.01)
  *A61H 3/04* (2006.01)
  *B62B 3/00* (2006.01)
(52) U.S. Cl.
  CPC .............. *B62B 5/0069* (2013.01); *B62B 5/02* (2013.01); *B62B 5/04* (2013.01); *A61H 2003/046* (2013.01); *A61H 2201/018* (2013.01); *A61H 2201/5069* (2013.01)
(58) Field of Classification Search
  CPC ........ A61H 2003/046; A61H 2003/049; A61H 2201/5069
  USPC ........................................................ 180/218
  See application file for complete search history.

(56) References Cited

U.S. PATENT DOCUMENTS

| | | | | |
|---|---|---|---|---|
| 5,746,282 | A | * | 5/1998 | Fujiwara ................ B60K 26/02 180/6.2 |
| 7,178,614 | B2 | * | 2/2007 | Ishii ........................ B60K 1/02 180/218 |
| 2005/0067804 | A1 | * | 3/2005 | Tolfsen ................... A61H 3/04 280/87.041 |
| 2005/0183759 | A1 | * | 8/2005 | Wolfe ...................... A61H 3/04 135/67 |
| 2006/0254831 | A1 | * | 11/2006 | Kamei .................. B62B 5/0026 180/6.5 |
| 2007/0073425 | A1 | * | 3/2007 | Nakashima ............. B62K 3/00 700/71 |
| 2009/0138232 | A1 | * | 5/2009 | Fuwa ..................... G01B 21/22 702/154 |

FOREIGN PATENT DOCUMENTS

| | | |
|---|---|---|
| JP | 2008-080895 A | 4/2008 |
| JP | 2012-250569 A | 12/2012 |

OTHER PUBLICATIONS

Written Opinion issued in Application No. PCT/JP2014/076752 dated Nov. 18, 2014.

* cited by examiner

PUSHCART

BACKGROUND

Technical Field

The present disclosure relates to pushcarts including wheels.

When a conventional pushcart is in use, in order to ride over a step, such an operation is carried out in some case that a front wheel of the pushcart is rotated about a rear wheel thereof to be floated, thereby riding over the step.

For example, in a pushcart disclosed in Patent Document 1, when a user operates a lever, a rear wheel is moved from a rear position to a front position, whereby a front wheel can be lifted with ease.

Patent Document 1: Japanese Unexamined Patent Application Publication No. 2008-80895

BRIEF SUMMARY

However, because a state of the front wheel being lifted is unstable, there is a possibility that the pushcart proceeds regardless of a user's will.

As such, the present disclosure provides a pushcart that is prevented from proceeding against a user's will.

A pushcart according to the present disclosure includes a main body, a rear wheel connected to the main body in a rotatable manner, a front wheel connected to the main body in a rotatable manner, and a holding portion provided on the main body; the stated pushcart further includes a detector for detecting an operation of a user to move the front wheel in a direction being distanced from a ground contact surface, and a velocity limiting unit that limits a rotational velocity of the rear wheel to less than a predetermined rotational velocity in the case where the above detector detects the operation to move the front wheel in a direction being distanced from the ground contact surface.

As described above, in the case where a user carries out an operation to move the front wheel in a direction being distanced from the ground contact surface, because the rotational velocity of the rear wheel is limited to less than a predetermined rotational velocity, the pushcart is prevented from proceeding against a user's will. The function to limit the rotational velocity is realized by providing a mechanism as follows: that is, there is provided a step board whose attachment angle to the main body is so fixed as to fall within a predetermined range, for example; when the user steps on the step board, a mechanical braking force is applied to the rear wheel in response to the above stepping operation, whereby the rotational speed is limited.

The pushcart may be such a pushcart (electrically-operated pushcart) that includes a driver unit for rotationally driving the rear wheel and a controller for controlling the rotational driving operation of the driver unit. In this case, the aforementioned velocity limiting unit is realized by the controller performing control to suppress the rotational velocity of the rear wheel so as to be no more than a predetermined rotational velocity.

Further, the pushcart includes a main body angle change detector for detecting an angle change of the main body in a pitch direction and a reception unit for receiving an operation from a user to move the front wheel in a direction being distanced from the ground contact surface. In the stated pushcart, the controller can also have a first control mode in which inverted pendulum control to control the rotation of the rear wheel so as to make the angle change of the main body become 0 is performed, and a second control mode in which control to turn off the inverted pendulum control and suppress the rotational velocity of the rear wheel so as to be no more than a predetermined rotational velocity is performed in the case where the aforementioned reception unit receives the operation to move the front wheel in a direction being distanced from the ground contact surface. In this case, an intersecting angle of the front wheel supporter with respect to a rotational shaft of the rear wheel or the main body can be limited to a predetermined range.

In the case where the front wheel is not in contact with the ground surface in the first control mode, the intersecting angle between the main body and a front wheel supporter can be always fixed.

In the case where the front wheel is in contact with the ground surface in the first control mode, the intersecting angle between the main body and the front wheel supporter can be fixed if the reception unit receives the operation to move the front wheel in a direction being distanced from the ground contact surface.

Further, in the case where the reception unit receives the operation to move the front wheel in a direction being distanced from the ground contact surface, the controller can turn off the inverted pendulum control and control to make the rear wheel proceed in a travelling direction for a predetermined time or by a predetermined distance.

The rotational velocity of the rear wheel can be limited and that the rear wheel can be prevented from rotating in a reverse direction.

According to the present disclosure, a pushcart can be prevented from proceeding against a user's will.

DETAILED DESCRIPTION

Figure 1:
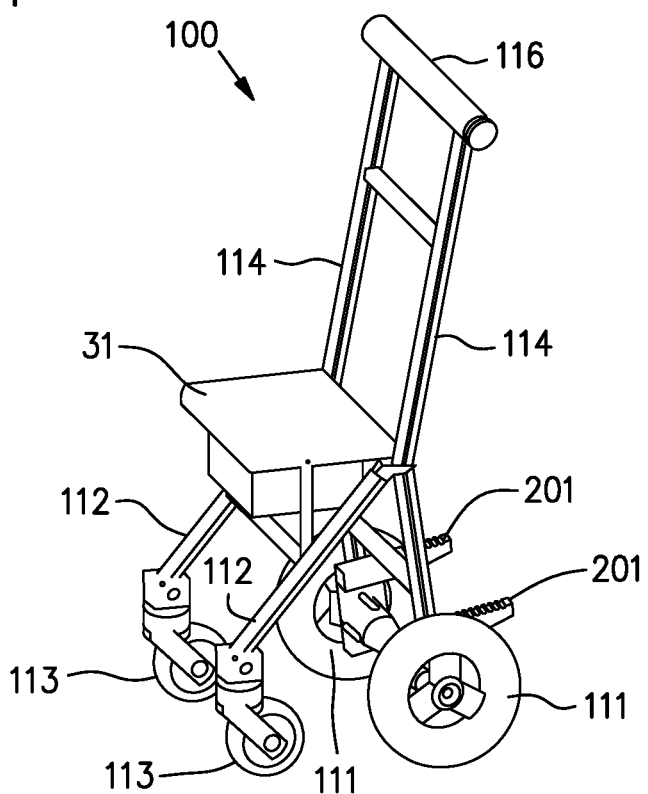
FIG. 1 is a perspective view of a pushcart.
Figure 2A:
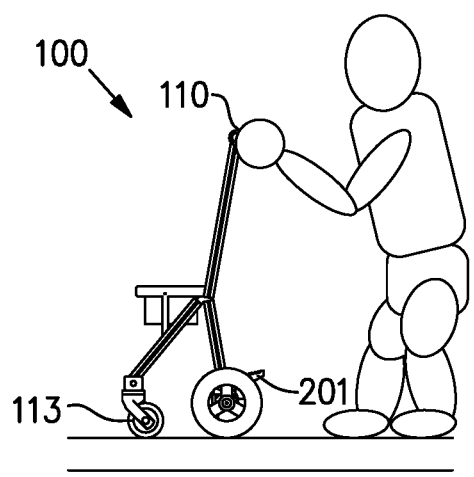
FIGS. 2A and 2B include diagrams each illustrating a state, viewed from a side, when a user is pushing a pushcart.
Figure 2B:
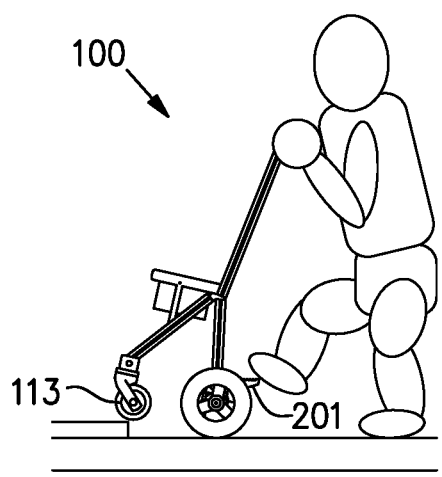
Figure 3A:
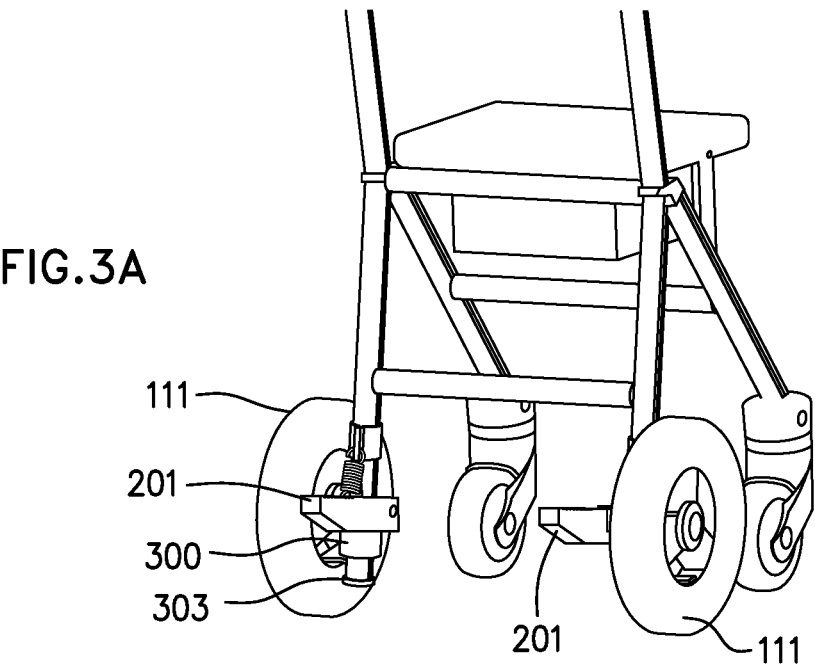
FIGS. 3A and 3B include enlarged views of a rear wheel portion of a pushcart.
Figure 3B:
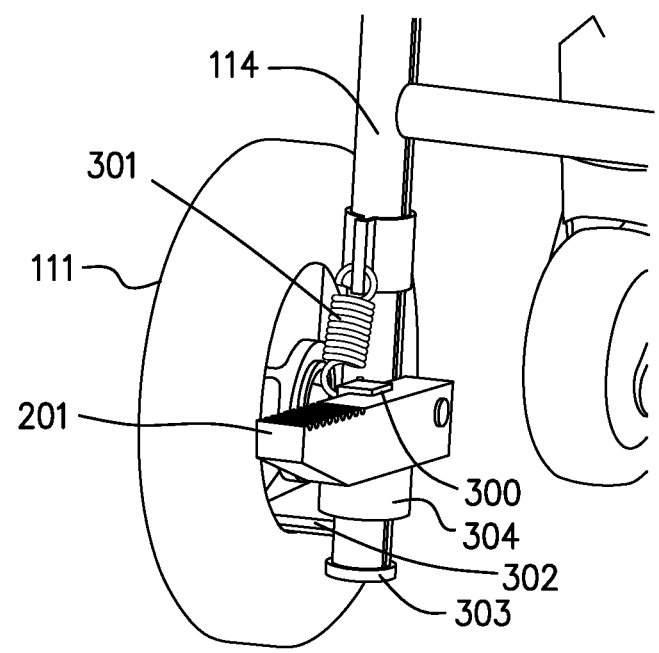

FIG. 1 is a perspective view of a pushcart 100 according to a first embodiment, FIGS. 2A and 2B show diagrams each illustrating a state, viewed from a side, when a user is pushing the pushcart, and FIGS. 3A and 3B show enlarged views of a rear wheel portion of the pushcart.

The pushcart 100 includes a main body 114 formed of bar-like members elongate in an up-down direction, a pair of rear wheels 111 connected to the main body 114 at a lower side thereof in a rotatable manner, a holding portion 116 connected to the main body 114 at an upper side thereof, a step board 201 attached to the main body 114 at a position near the rear wheel 111, a front wheel supporter 112 connected to the main body 114 at a position near the center of the main body 114 and extending in an obliquely forward direction, front wheels 113 each connected to the front wheel supporter 112 in a rotatable manner at the opposite side to a side where the front wheel supporter 112 is connected to the main body 114, and a seat unit 31 connected to the main body 114 and the front wheel supporter 112.

Although an example in which the rear wheels 111 take the form of two wheels is cited in the present embodiment, the rear wheels 111 may take the form of one or no less than three wheels. In addition, although an example in which the front wheels 113 also take the form of two wheels is cited in the present disclosure, the front wheels 113 may take the form of one or no less than three wheels.

As shown in FIG. 2A, a user holds the holding portion 116 and pushes the pushcart 100. Then, as shown in FIG. 2B, in the case where there is a step in front of the user, the user steps on the step board 201. Since the attachment angle of the step board 201 to the main body 114 is so fixed as to fall within a predetermined range, the main body 114 tilts backward when the user steps on the step board 201. Since the front wheels 113 are connected to the main body 114 with the front wheel supporter 112 therebetween, the front wheels 113 are floated from the ground contact surface. In this manner, the user carries out the operation in which the front wheels 113 are floated while taking the rear wheels 111 as an axis so as to ride over the step.

However, because a state of the front wheels 113 being lifted is unstable, there is a possibility that the pushcart 100 proceeds regardless of a user's will. As such, as shown in FIGS. 3A and 3B and FIG. 4, the pushcart 100 includes a mechanism for limiting the rotational velocity of the rear wheels 111 to less than a predetermined rotational velocity in the case where the user steps on the step board 201 to carry out the operation to move the front wheels 113 in a direction being distanced from the ground contact surface, so as to prevent the pushcart 100 from proceeding against the user's will.

Figure 4:
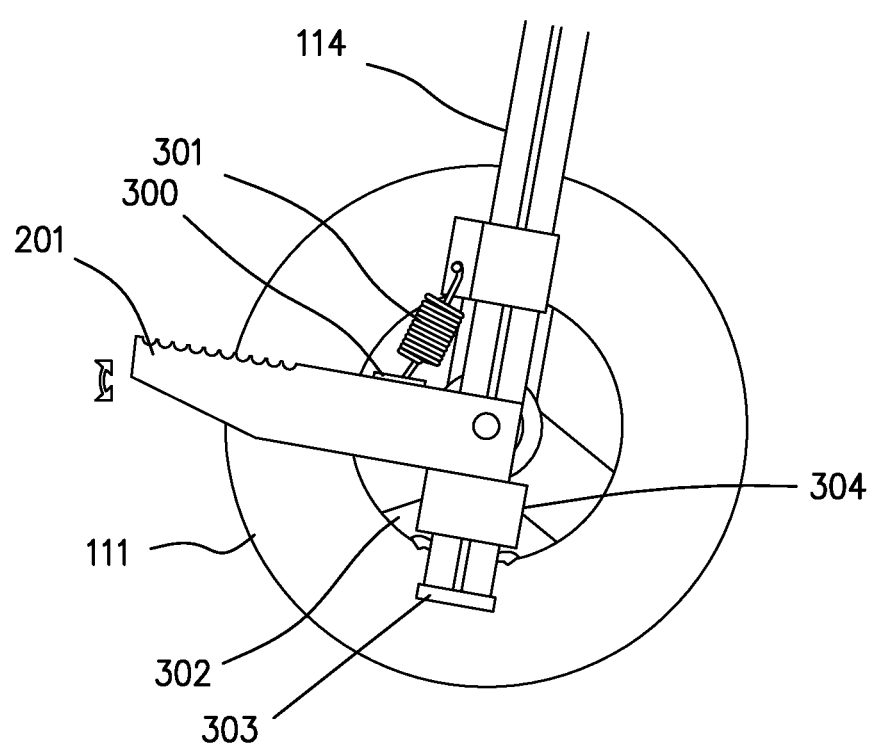
FIG. 4 is an enlarged side view of a rear wheel portion of a pushcart.

As shown in an enlarged side view of FIG. 4, the step board 201 is connected to the main body 114 in a rotatable manner. Further, the step board 201 is biased toward the upper side due to a tensile force of a spring 301 while taking its attachment position to the main body 114 as an axis, and its attachment angle to the main body 114 is so fixed by a stopper 300 as to fall within a predetermined range.

Further, a cylinder unit 304 that covers a side surface of the bar-like main body 114 is provided on the lower side of the step board 201. The cylinder portion 304 is connected to a brake shoe 302. Accordingly, when the user steps on the step board 201, the cylinder unit 304 is moved downward so that the brake shoe 302 makes contact with part of the rear wheel 111, thereby limiting the rotational velocity of the rear wheel 111. In this case, a detector of the present disclosure is realized by the step board 201 and the cylinder unit 304, and a velocity limiting unit of the present disclosure is realized by the brake shoe 302.

Note that a stopper 303 is provided at the lowermost portion of the main body 114. By limiting an amount of movement of the cylinder unit 304 using the stopper 303, the brake shoe 302 is prevented from making contact with part of the rear wheel 111 with a larger pressure than necessary, thereby gently limiting the rotational velocity of the rear wheel 111.

As discussed above, in the case where a user carries out an operation to move the front wheels 113 in a direction being distanced from the ground contact surface, the pushcart 100 can be prevented from proceeding against a user's will through limiting the rotational velocity of the rear wheels 113 to less than a predetermined rotational velocity.

The pushcart 100 may be so configured as to continuously limit the rotational velocity of the rear wheels 111 to less than a predetermined rotational velocity during the step board 201 being stepped on, or configured as to switch the control modes every time the step board 201 is stepped on. In particular, in the case where the control modes are switched every time the step board 201 is stepped on, because it is unnecessary to keep stepping on the step board 201, there is no fear that the operator loses the balance and so on.

Further, in the case where the control modes are switched every time the step board 201 is stepped on, the following configuration may also be made: that is, after having been switched to a second control mode by stepping on the step board, the control mode is automatically switched to the original mode when a constant time has passed or the pushcart has moved a constant distance. In this case, it is unnecessary to step on the step board 201 multiple times, which brings an advantage that the pushcart is easily operated.

Furthermore, the following configuration may also be made: that is, after having been switched to the second control mode by stepping on the step board 201, the control mode is switched to a first control mode upon detecting the front wheels are in contact again with the ground contact surface. In this case, there is no fear that the control mode is switched due to the step board 201 being unintendedly stepped on. A plurality of functions may be provided in the case of stepping on the step board 201.

Figure 5A:
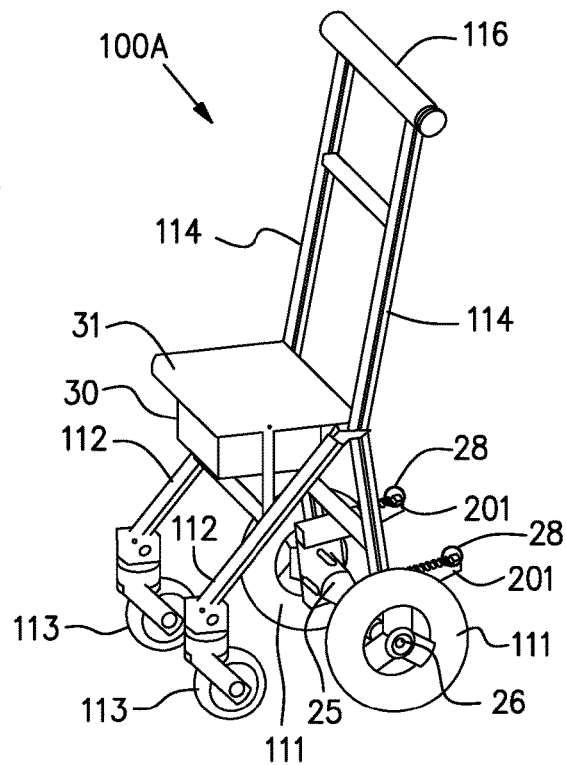
FIG. 5A is a perspective view of a pushcart according to a first variation.
Figure 5B:
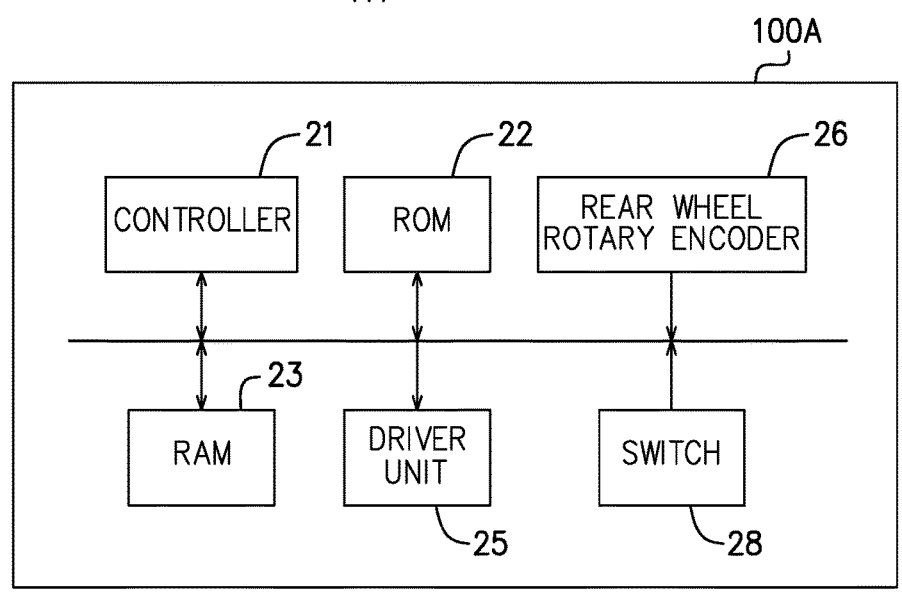
FIG. 5B is a hardware block diagram thereof.

Next, FIG. 5A is a perspective view of a pushcart 100A according to a first variation, and FIG. 5B is a block diagram illustrating a hardware configuration of the pushcart 100A. In FIG. 5A, constituent elements common to FIG. 1 are assigned the same reference signs, and descriptions thereof are omitted herein.

The pushcart 100A is an electrically-operated pushcart including a driver unit 25 for rotationally driving the rear wheels 111. The pair of rear wheels 111 is attached to the same shaft and rotates in synchronization with each other. However, they can be separately driven and rotated.

Moreover, the number of wheels may be four (in other words, four-wheel drive). In this case, the pushcart 100A may not drive the front wheels when the step board 201 is stepped on and the pushcart 100A travels with two wheels. Because of this, the pushcart 100A will not make a sudden dash due to the front wheels being unintendedly caught by something.

A box 30 storing a control circuit board, a battery, and the like is attached on the lower side of the seat unit 31. The front wheel supporter 112 may be configured such that it is connected not to the main body 114, but to the rotational shaft of the rear wheels 111. Further, the pushcart may be configured such that an input I/F for detecting operation of the user is provided in the holding portion 116 and motor control is performed in response to the operation of the user.

As shown in FIG. 5B, the pushcart 100A includes, as hardware, a controller 21, a ROM 22, a RAM 23, the driver unit 25, a rear wheel rotary encoder 26, and a switch 28.

The controller 21 is a functional unit configured to integrally control the pushcart 100A, reads out programs stored in the ROM 22, and loads these programs in the RAM 23 so as to realize various kinds of operations.

The rear wheel rotary encoder 26 detects a rotational angle of the rear wheels 111 and outputs the detected result to the controller 21. The controller 21 is capable of calculating a rotational velocity or rotational acceleration of the rear wheels based on the rotational angle inputted from the rear wheel rotary encoder 26. Then, the controller 21 calculates torque to be applied to a motor (not illustrated) by the driver unit 25 in accordance with the calculated rotational velocity or rotational acceleration.

The driver unit 25 is a functional unit configured to drive a motor that rotates the shaft attached to the rear wheels 111, and applies the torque having been calculated by the controller 21 to the motor of the rear wheels 111 so as to rotationally drive the rear wheels 111.

With this, when a user moves the pushcart 100A forward or backward, an application torque for reducing a force of the user to push the pushcart 100A is calculated, and then the rear wheels 111 are rotationally driven.

In the case where an operation by the user to move the front wheels in a direction being distanced from the ground contact surface is detected, the controller 21 performs control to suppress the rotational velocity of the rear wheels 111 so as to be no more than a predetermined rotational velocity.

Figure 6:
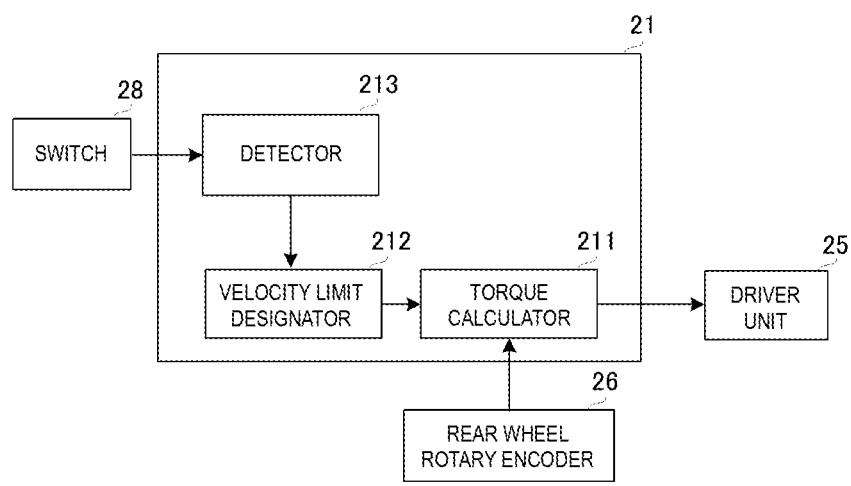
FIG. 6 is a functional block diagram of the pushcart according to the first variation.

FIG. 6 is a functional block diagram of the controller 21. The controller 21 includes a torque calculator 211, a velocity limit designator 212, and a detector 213. The torque calculator 211 calculates a rotational velocity or rotational acceleration of the rear wheels 111 based on the rotational angle of the rear wheels 111 inputted from the rear wheel rotary encoder 26, and then calculates an application torque in accordance with the calculated rotational velocity or rotational acceleration. Note that the torque calculator 211 calculates the application torque so as not to exceed a velocity limit designated by the velocity limit designator 212. The term referred to as "velocity limit" herein is a forward velocity or a backward velocity of the pushcart 100A, which is so designated as to be no more than a typical walking velocity (for example, 3 km/h). A relationship between the forward or backward velocity and the application torque is measured in advance and stored in the ROM 22.

In this example, the switch 28 is attached to the step board 201. The detector 213 of the controller 21 detects a signal outputted from the switch 28 when a user steps on the step board 201 and consequently detects the operation of the user to move the front wheels 113 in a direction being distanced from the ground contact surface. In the case where the detector 213 detects the operation of the user to move the front wheels 113 in a direction being distanced from the ground contact surface, the velocity limit designator 212 designates the backward velocity so as to be no more than 0 km/h so that the rear wheels 111 do not rotate in the reverse direction with respect to the travelling direction, and suppresses the forward velocity limit so as to be lower than usual (for example, no more than 2 km/h is designated). Accordingly, in the case where the operation of the user to move the front wheels 113 in a direction being distanced from the ground contact surface is detected, the controller 21 performs control to suppress the rotational velocity of the rear wheels 111 so as to be no more than a predetermined rotational velocity. Through this, the velocity limiting unit of the present disclosure is realized. It is not absolutely necessary to control the rear wheels 111 so that they do not rotate in the reverse direction with respect to the travelling direction.

In FIG. 5A, a structure in which the switch 28 is attached to the step board 201 is illustrated. However, the above-mentioned structure is merely an example, and any method may be used as long as the method realizes a structure that is capable of detecting the front wheels being floated. That is, for example, a structure in which a spring is expanded due to the weight of the front wheels 113 when the front wheels 113 have left the ground contact surface is employed; with this structure, the control to suppress the rotational velocity of the rear wheels 111 so as to be no more than a predetermined rotational velocity is performed by detecting the state of the spring being expanded.

Instead of detecting the operation of the user to move the front wheels 113 in a direction being distanced from the ground contact surface, the front wheels 113 can leave the ground contact surface as a result of the user staying at the current position by rotating the rear wheels 111 in the forward direction for a predetermined time or by a predetermined distance.

In particular, in the case of a pushcart having an electric assistant function with a motor, when the front wheels are in a state of being distanced from the ground contact surface (wheelie), the pushcart is in an unstable state because of being supported only by the rear wheels and additionally the driving force from the motor is applied thereto. As such, since such a possibility that the pushcart falls over is likely to increase, it is extremely effective to impose a velocity limit on the rear wheels.

Needless to say, a mechanical velocity limiting mechanism such as that shown in FIGS. 3A, 3B, and 4 may be provided as well in the pushcart 100A.

Figure 7A:
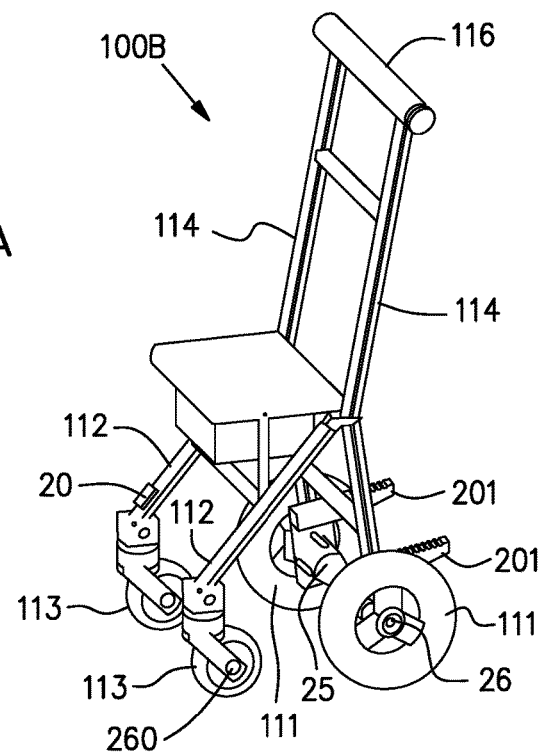
FIG. 7A is a perspective view of a pushcart according to a second variation.
Figure 7B:
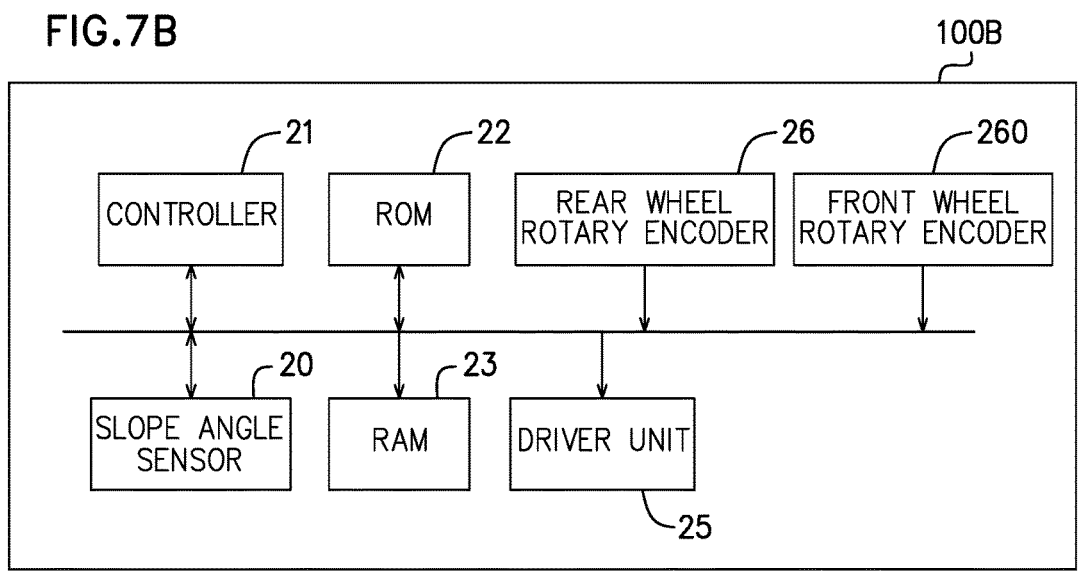
FIG. 7B is a hardware block diagram thereof.

Next, FIG. 7A is a perspective view of a pushcart 100B according to a second variation, and FIG. 7B is a block diagram illustrating a hardware configuration of the pushcart 100B. In FIGS. 7A and 7B, the same constituent elements as those of the pushcart 100A shown in FIGS. 5A and 5B are assigned the same reference signs, and descriptions thereof are omitted herein.

A slope angle sensor 20, in place of the switch 28 in the configuration of the pushcart 100A, is attached to the front wheel supporter 112 of the pushcart 100B according to the second variation. The pushcart 100B further includes a front wheel rotary encoder 260.

Figure 8:
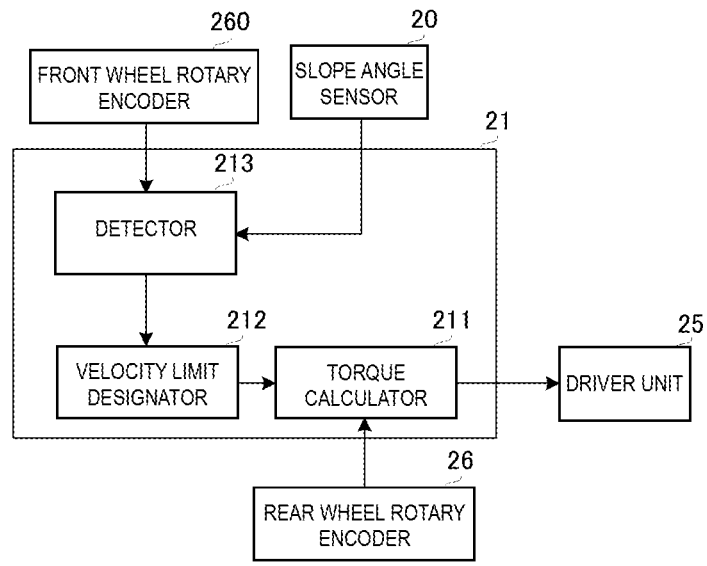
FIG. 8 is a functional block diagram of the pushcart according to the second variation.

As shown in a functional block diagram of FIG. 8, the detector 213 of the controller 21 calculates a rotational velocity of the front wheels 113 based on the rotational angle of the front wheels 113 inputted from the front wheel rotary encoder 260. In addition, the detector 213 inputs a slope angle of the front wheel supporter 112 from the slope angle sensor 20. In the case where the rotational velocity of the front wheels 113 is nearly 0 and the slope angle of the front wheel supporter 112 becomes no less than a predetermined angle (for example, 10 degrees corresponding to a typical ascending slope), the detector 213 determines that the front wheels 113 are being floated and a user has carried out an operation to move the front wheels 113 in a direction being distanced from the ground contact surface. The control thereafter is the same as that of the controller 21 shown in FIG. 6.

Needless to say, also in the pushcart 100B, a mechanical velocity limiting mechanism such as that shown in FIGS. 3A, 3B, and 4 may be provided.

Figure 9:
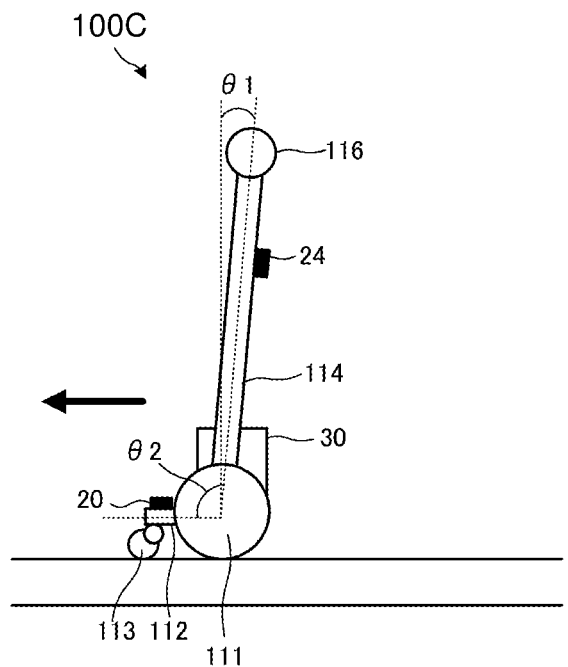
FIG. 9 is a schematic diagram of a pushcart according to a third variation when viewed from a side.
Figure 10:
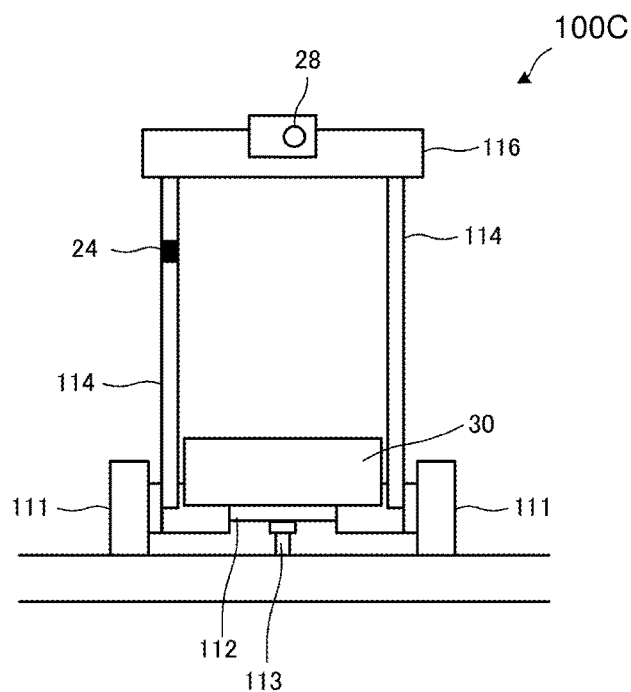
FIG. 10 is a schematic diagram of the pushcart according to the third variation when viewed from the front.
Figure 11:
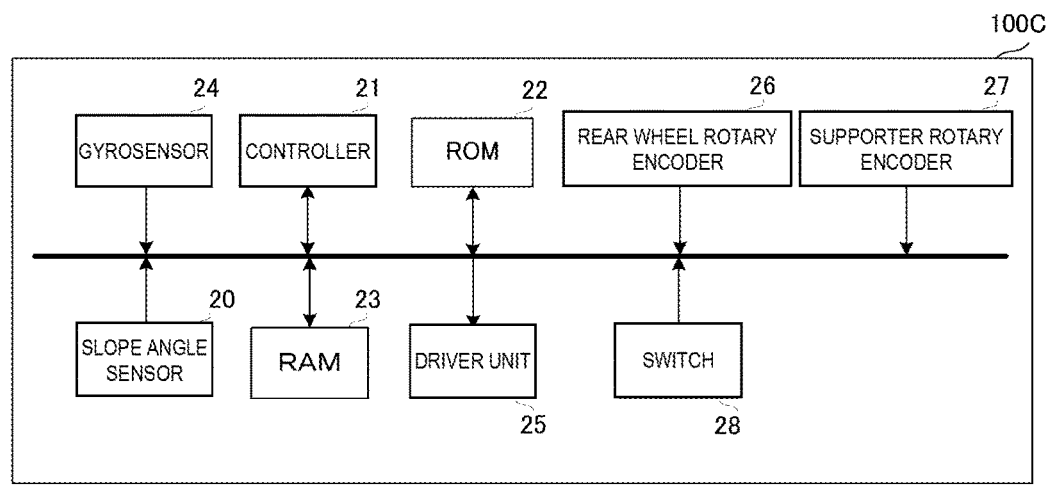
FIG. 11 is a block diagram illustrating a hardware configuration of the pushcart according to the third variation.

Next, FIG. 9 is a schematic diagram of a pushcart 100C according to a third variation when viewed from a side, and FIG. 10 is a schematic diagram thereof when viewed from the front. FIG. 11 is a block diagram illustrating a hardware configuration of the pushcart 100C.

In the pushcart 100C, the main body 114 is connected to the rear wheels 111 in a rotatable manner in the pitch direction (a rotational direction about the shaft of the rear wheels 111 in FIG. 9). A gyrosensor 24 is attached to the main body 114. The gyrosensor 24 corresponds to a main body angle change detector of the present disclosure, and detects an angular velocity of the main body 114 in the pitch direction and outputs the detected result to the controller 21.

One end of the front wheel supporter 112 is connected to the rotational shaft of the rear wheels 111, and is formed with a thin plate-like member extending forward relative to the rear wheels 111 in the travelling direction (a direction indicated by an arrow in the drawing). The front wheel supporter 112 is connected to the rotational shaft of the rear wheels 111 in a rotatable manner in the pitch direction so as to extend in parallel to a horizontal ground surface. A supporter rotary encoder 27 detects an intersecting angle which is an angle formed by the main body 114 and the front wheel supporter 112, and outputs the detected result to the controller 21. The slope angle detector 20 is provided on the front wheel supporter 112, detects a slope angle of the front wheel supporter 112 in the pitch direction relative to the vertical direction, and outputs the detected result to the controller 21.

The pushcart 100C may further include, in addition to the above-discussed constituent elements, an acceleration sensor for detecting acceleration of the main body 114 in each direction, a rotary encoder for detecting a rotational angle of the front wheels 113, and so on.

The front wheels 113 are connected to a lower surface of the front wheel supporter 112 on the opposite direction side to a side where the front wheel supporter 112 is connected to the rear wheels 111. With this, both the rear wheels 111 and the front wheels 113 make contact with the ground surface. Note that the intersecting angle formed by the front wheel supporter 112 and the main body 114 is limited so as to fall within a predetermined angle range (for example, 30 degrees) by a stopper or the like.

The box 30 storing a control circuit board, a battery, and the like is mounted on the front wheel supporter 112. The front wheel supporter 112 may be connected not to the rotational shaft of the rear wheels 111, but to the main body 114 in a rotatable manner in the pitch direction.

In this example, the switch 28 is provided in the holding portion 116. A user presses the switch 28 when carrying out the operation to move the front wheels 113 in a direction being distanced from the ground contact surface.

In this example, as a basic operation (hereinafter, referred to as "first control mode"), the controller 21 performs inverted pendulum control through controlling the driver unit 25 so as to make the angle change of the main body 114 in the pitch direction become 0.

Figure 12A:
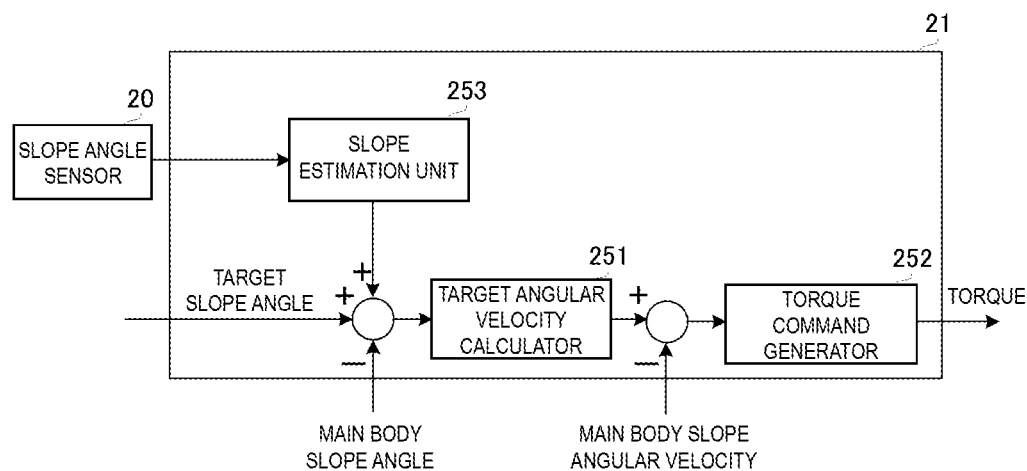
FIGS. 12A and 12B include functional block diagrams illustrating a hardware configuration of the pushcart according to the third variation.

FIG. 12A is a functional block diagram of the controller 21 in the first control mode. In the first control mode, the controller 21 includes a target angular velocity calculator 251, a torque command generator 252, and a slope estimation unit 253.

The target angular velocity calculator 251 inputs a differential value between a target slope angle (in this case, a slope angle tilted backward relative to the vertical direction by slightly more than 0 degree) and a current slope angle $\theta 1$ of the main body 114, and calculates a slope angular velocity of the main body 114 so as to make the above differential value become 0. The current slope angle of the main body 114 is obtained by integrating the output value of the gyrosensor 24 or by attaching a slope angle sensor (not illustrated) to the main body 114. The above current slope angle can be also obtained from an intersecting angle $\theta 2$ between the main body 114 and the front wheel supporter 112 inputted from the supporter rotary encoder 27. As described above, the front wheel supporter 112 is connected to the shaft of the rear wheels 111 so as to be parallel to the horizontal ground surface. As such, in the case where the slope angle $\theta 1$ of the main body 114 is considered to be 0 degree when the intersecting angle $\theta 2$ is 90 degrees, the current slope angle $\theta 1$ of the main body 114 is estimated in a manner in which the main body 114 is thought to be tilted forward in the travelling direction when the intersecting angle $\theta 2$ becomes larger or tilted backward in the travelling direction when the intersecting angle $\theta 2$ becomes smaller.

The slope estimation unit 253 calculates a correction angle in accordance with a slope angle of the ground surface that is estimated based on a value of the slope angle sensor 20. With this, in the case where the pushcart 100C is proceeding on an ascending slope, for example, a force that pulls a user can be obtained by correcting the target angle so as to make the main body 114 tilt forward relative to the vertical direction, thereby making it possible to proceed on the ascending slope more comfortably. On the other hand, in the case where the pushcart 100C is proceeding on a descending slope, a force that pushes the user backward can be obtained by correcting the target angle so as to make the main body 114 tilt backward relative to the vertical direction. The above pushing force acts as a braking effect, thereby making it possible for the user to proceed on the descending slope more safely.

Further, the torque command generator 252 inputs a differential value between the slope angular velocity calculated by the target angular velocity calculator 251 and the current slope angular velocity of the main body 114 inputted from the gyrosensor 24, and calculate an application torque so as to make the above differential value become 0.

With this, the pushcart 100C performs inverted pendulum control as the first control mode so that the posture of the main body 114 is controlled to be constant.

In the above discussion, it is described that the gyrosensor 24 corresponds to the main body angle change detector of the present disclosure. However, in the case where a current slope angle of the main body 114 is estimated from the intersecting angle, the supporter rotary encoder 27 is also included in the main body slope change detector of the present disclosure. Further, in the case where a slope angle sensor (not illustrated) is attached to the main body 114, the stated slope angle sensor (not illustrated) attached to the main body 114 is also included in the main body angle change detector of the present disclosure.

Figure 12B:
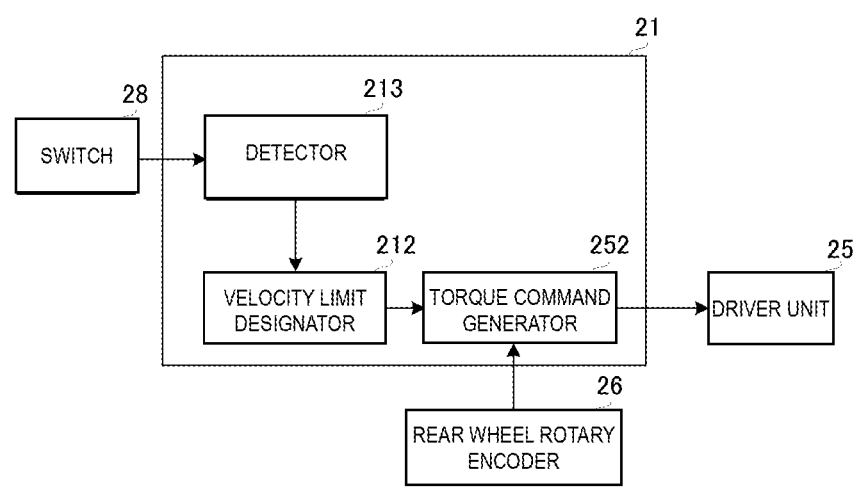

Then, upon receiving an operation of a user using the switch 28 to move the front wheels 113 in a direction being distanced from the ground contact surface, the pushcart 100C turns off the inverted pendulum control and locks the rotatable mechanism so that the intersecting angle $\theta 2$ between the main body 114 and the front wheel supporter 112 takes a fixed angle. This makes the front wheel supporter 112 be associated with the slope of the main body 114, so that the front wheels 113 can be distanced from the ground contact surface. As shown in FIG. 12B, control to suppress the rotational velocity of the rear wheels 111 so as to be no more than a predetermined rotational velocity (second control mode) is performed.

The second control mode carries out the same operations as those of the pushcart 100A shown in FIG. 6. Needless to say, a mechanical velocity limiting mechanism such as that shown in FIGS. 3A, 3B, and 4 may be also provided in the pushcart 100C.

Figure 13:
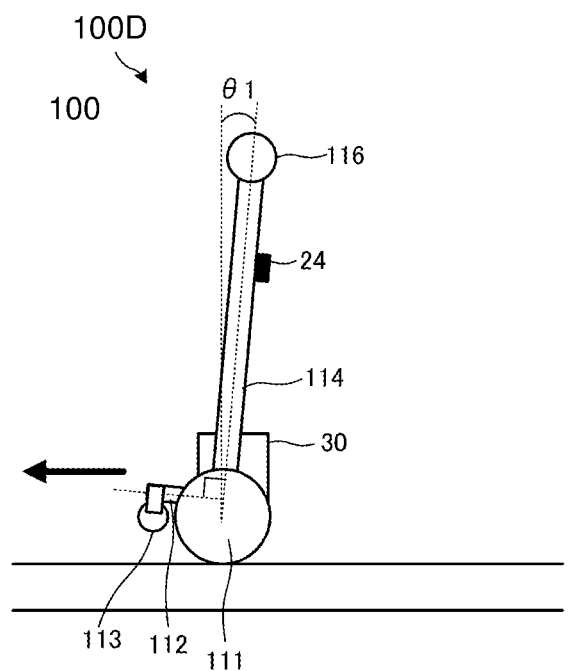
FIG. 13 is a schematic diagram of a pushcart according to a fourth variation when viewed from a side.

Next, FIG. 13 is a schematic diagram of a pushcart 100D according to a fourth variation when viewed from a side. The same constituent elements as those of the pushcart 100C in FIG. 9 are assigned the same reference signs, and descriptions thereof are omitted herein.

The front wheel supporter 112 in the pushcart 100D is connected to the main body 114 and the front wheels 113 are in a state of being floated from the ground contact surface. Specifically, each of the front wheels 113 is present at a higher position than a step which the pushcart 100D is required to ride over without necessarily being lifted itself in a normal usage mode. In the case where the radius of the rear wheel 111 is taken as R, a lower end of the front wheel 113 can be set at a position no less than R relative to the ground contact surface with which the rear wheels 111 are in contact.

In this example, the intersecting angle between the front wheel supporter 112 and the main body 114 is fixed to a predetermined angle (for example, 90 degrees). Note that the front wheel supporter 112 may be supported by the main body 114 in a rotatable manner in the pitch direction with each lower end of the front wheels 113 not making contact with the ground contact surface, and may also be supported having a predetermined movable range.

A hardware configuration, functions of the controller 21, and so on of the pushcart 100D are the same as those of the pushcart 100C.

In the case where a step is present in the travelling direction of the pushcart 100D, the user makes the front wheels 113 be in contact with a ground surface on the step in advance, and then applies a force in a direction in which the pushcart 100D is to be lifted while taking the front wheels 113 as a fulcrum, thereby making it possible to ride over the step.

In the case where the user presses the switch 28, the inverted pendulum control is turned off and the control shown in FIG. 12B (second control mode) is performed in which the rotational velocity of the rear wheels 111 is suppressed so as to be no more than a predetermined rotational velocity. In this case, the user tilts the main body 114 backward so as to move the front wheels 113 to a higher position, thereby making it possible to ride over a higher step.

Although an example of the pushcart as a walking frame is discussed in the present embodiment, the present disclosure may be applied to a dolly, a wheelchair, a baby carriage, and so on, in addition to the walking assistant car.

REFERENCE SIGNS LIST

100 PUSHCART
31 SEAT UNIT
111 REAR WHEEL
112 FRONT WHEEL SUPPORTER
113 FRONT WHEEL
114 MAIN BODY
116 HOLDING PORTION
201 STEP BOARD
300 STOPPER
302 BRAKE SHOE
303 STOPPER
304 CYLINDER UNIT

The invention claimed is:

1. A pushcart including:
a main body;
a rear wheel connected to the main body in a rotatable manner;
a front wheel connected to the main body in a rotatable manner;
a holding portion provided on the main body;
a detector that detects an operation of a user to move the front wheel in a direction being distanced from a ground contact surface;
a velocity limiting unit that limits a rotational velocity of the rear wheel to less than a predetermined rotational velocity in a case where the detector detects the operation to move the front wheel in the direction being distanced from the ground contact surface;
a driver unit that rotationally drives the rear wheel; and
a controller that controls the driver unit so as to prevent the rear wheel from rotating in a reverse direction with respect to the travelling direction in a case where the detector detects the operation to move the front wheel in the direction being distanced from the ground contact surface.

2. The pushcart according to claim 1,
wherein the controller controls the rotational driving operation of the driver unit,
wherein the velocity limiting unit is realized by the controller performing control to suppress the rotational velocity of the rear wheel so as to be no more than a predetermined rotational velocity.

3. The pushcart according to claim 2,
wherein there is provided a step board, and an attachment angle of the step board to the main body is so fixed as to fall within a predetermined range.

4. The pushcart according to claim 1,
wherein there is provided a step board, and an attachment angle of the step board to the main body is so fixed as to fall within a predetermined range.

5. A pushcart comprising:
a main body;
a rear wheel connected to the main body in a rotatable manner;
a front wheel supporter, one end of the front wheel supporter being connected to a rotational shaft of the rear wheel or the main body;
a front wheel connected to the other end of the front wheel supporter in a rotatable manner;
a holding portion provided on the main body;
a driver unit that rotationally drives the rear wheel;
a controller that controls the rotational driving operation of the driver unit;
a main body angle change detector that detects an angle change of the main body in a pitch direction; and
a reception unit that receives an operation from a user to move the front wheel in a direction being distanced from a ground contact surface,
wherein the controller has a first control mode in which inverted pendulum control is performed to control the rotation of the rear wheel so that the angle change of the main body becomes 0, and
the controller has a second control mode in which control is performed to turn off the inverted pendulum control and suppress a rotational velocity of the rear wheel so as to be no more than a predetermined rotational velocity in the case where the reception unit receives the operation to move the front wheel in a direction being distanced from the ground contact surface.

6. The pushcart according to claim 5,
wherein an intersecting angle of the front wheel supporter with respect to a rotational shaft of the rear wheel or the main body is limited to a predetermined range.

7. The pushcart according to claim 6,
wherein, in the case where the reception unit receives the operation to move the front wheel in a direction being distanced from the ground contact surface, the controller turns off the inverted pendulum control and controls to make the rear wheel proceed in a travelling direction for a predetermined time or by a predetermined distance.

8. The pushcart according to claim 6,
wherein the controller controls the driver unit so as to prevent the rear wheel from rotating in a reverse direction with respect to the travelling direction.

9. The pushcart according to claim 6,
wherein there is provided a step board, and an attachment angle of the step board to the main body is so fixed as to fall within a predetermined range.

10. The pushcart according to claim 6,
wherein the front wheel is in contact with the ground surface in the first control mode, and
the intersecting angle between the main body and the front wheel supporter is fixed in the case where the reception unit receives the operation to move the front wheel in a direction being distanced from the ground contact surface.

11. The pushcart according to claim 6,
wherein the controller controls the driver unit so as to prevent the rear wheel from rotating in a reverse direction with respect to the travelling direction.

12. The pushcart according to claim 6,
wherein there is provided a step board, and an attachment angle of the step board to the main body is so fixed as to fall within a predetermined range.

13. The pushcart according to claim 5,
wherein the front wheel is not in contact with the ground surface in the first control mode, and
the intersecting angle between the main body and the front wheel supporter is always fixed.

14. The pushcart according to claim 5,
wherein the controller controls the driver unit so as to prevent the rear wheel from rotating in a reverse direction with respect to the travelling direction.

15. The pushcart according to claim 5,
wherein there is provided a step board, and an attachment angle of the step board to the main body is so fixed as to fall within a predetermined range.

16. The pushcart according to claim 5,
wherein, in the case where the reception unit receives the operation to move the front wheel in a direction being distanced from the ground contact surface, the controller turns off the inverted pendulum control and controls to make the rear wheel proceed in a travelling direction for a predetermined time or by a predetermined distance.

17. The pushcart according to claim 7,
wherein the controller controls the driver unit so as to prevent the rear wheel from rotating in a reverse direction with respect to the travelling direction.

18. The pushcart according to claim 7,
wherein there is provided a step board, and an attachment angle of the step board to the main body is so fixed as to fall within a predetermined range.

19. The pushcart according to claim 5, wherein the controller controls the driver unit so as to prevent the rear wheel from rotating in a reverse direction with respect to the travelling direction.

20. The pushcart according to claim 5,
wherein there is provided a step board, and an attachment angle of the step board to the main body is so fixed as to fall within a predetermined range.

* * * * *

UNITED STATES PATENT AND TRADEMARK OFFICE
CERTIFICATE OF CORRECTION

PATENT NO. : 10,232,871 B2
APPLICATION NO. : 15/092711
DATED : March 19, 2019
INVENTOR(S) : Yoshitaka Hane Page 1 of 1

It is certified that error appears in the above-identified patent and that said Letters Patent is hereby corrected as shown below:

In the Claims

Column 11, Line 32, Claim 11: "claim 6," should read -- claim 10 --

Column 11, Line 36, Claim 12: "claim 6," should read -- claim 10 --

Column 12, Line 6, Claim 14: "claim 5," should read -- claim 13 --

Column 12, Line 10, Claim 15: "claim 5," should read -- claim 13 --

Column 12, Line 22, Claim 17: "claim 7," should read -- claim 16 --

Column 12, Line 26, Claim 18: "claim 7," should read -- claim 16 --

Signed and Sealed this
Thirteenth Day of October, 2020

Andrei Iancu
*Director of the United States Patent and Trademark Office*